(12) United States Patent
Jang et al.

(10) Patent No.: US 12,546,624 B2
(45) Date of Patent: Feb. 10, 2026

(54) DEVICE AND METHOD FOR DISPLAYING ROAD CONDITIONS BASED ON ROAD CELLS

(71) Applicants: INPLAB Inc., Gimcheon-si (KR); KYUNGIL UNIVERSITY Industry-Academic Cooperation, Gyeongsan-si (KR)

(72) Inventors: Won Ho Jang, Gimcheon-si (KR); Jin Sang Hwang, Daegu (KR)

(73) Assignees: INPLAB INC., Gimcheon-si (KR); KYUNGIL UNIVERSITY Industry-Academic Cooperation, Gyeongsan-si (KR)

( * ) Notice: Subject to any disclaimer, the term of this patent is extended or adjusted under 35 U.S.C. 154(b) by 98 days.

(21) Appl. No.: 18/400,047

(22) Filed: Dec. 29, 2023

(65) Prior Publication Data

US 2025/0216216 A1  Jul. 3, 2025

(30) Foreign Application Priority Data

Dec. 27, 2023  (KR) .......................... 10-2023-0193115

(51) Int. Cl.
  *G01C 21/00* (2006.01)
(52) U.S. Cl.
  CPC ..... *G01C 21/3815* (2020.08); *G01C 21/3878* (2020.08); *G01C 21/3881* (2020.08)

(58) Field of Classification Search
  CPC ......... B60W 2552/53; B60W 2554/00; B60W 2555/20; B60W 2556/10; B60W 40/06; B60W 60/001; G01C 21/32
  See application file for complete search history.

(56) References Cited

U.S. PATENT DOCUMENTS

| 2021/0065565 | A1 * | 3/2021 | Dow ........................ G08G 5/55 |
| 2022/0163347 | A1 * | 5/2022 | Anastassov ........ G01C 21/3815 |

FOREIGN PATENT DOCUMENTS

| CN | 101777265 A | * | 7/2010 | ............... G08G 1/13 |
| KR | 101149754 B1 | * | 6/2012 | ........... G08G 1/0969 |
| WO | WO-2020087345 A1 | * | 5/2020 | .............. B25J 11/00 |
| WO | WO-2022130720 A1 | * | 6/2022 | ............... G06T 7/13 |

* cited by examiner

*Primary Examiner* — Redhwan K Mawari
(74) *Attorney, Agent, or Firm* — Sughrue Mion, PLLC (57) ABSTRACT

Provided are a device and method for displaying road conditions on the basis of road cells. The method includes receiving, by a server, a map including boundary and centerline information of a road and databasing the map, receiving, by the server, condition information of the road, generating, by the server, one or more cells by dividing the road on the map, and displaying, by the server, the condition information of the road in the cells. According to the method, road condition information is generated lane by lane so that a user can understand road conditions more intuitively.

9 Claims, 7 Drawing Sheets

DEVICE AND METHOD FOR DISPLAYING ROAD CONDITIONS BASED ON ROAD CELLS

CROSS-REFERENCE TO RELATED APPLICATION

This application claims priority to and the benefit of Korean Patent Application No. 10-2023-0193115, filed on Dec. 27, 2023, the disclosure of which is incorporated herein by reference in its entirety.

BACKGROUND

1. Field of the Invention

The present invention relates to a method of displaying road conditions on the basis of road cells, and more particularly, to a method for providing a service of dividing each lane into cells on a map on the basis of a precise road map and displaying road conditions in the cells.

2. Discussion of Related Art

Due to road aging and climate change, road surfaces deteriorate rapidly, and travel loads of vehicles are constantly creating conditions that lead to poor road surfaces such as potholes and cracks.

According to "Occurrence of potholes on expressways/local roads from 2011 to 2015" submitted by the Ministry of Land, Infrastructure and Transport, over the past five years, there have been more than 360,000 potholes on both expressways and local roads, exposing drivers to multiple risks of accidents. Potholes, which are typically formed during the winter and rainy seasons, are holes caused by crumbling in the asphalt on a roadway, and are known to be able to cause damage to a vehicle's wheels and suspension depending on their size.

Potholes and other defects in road surfaces are sometimes referred as road mines because they cause traffic accidents due to sudden braking while driving. From 2011 to 2015, there were a total of 260,931 potholes on local roads and 102,294 on expressways, that is, potholes form more than twice as often on local roads than on expressways. During this period, there were 607 accidents caused by potholes on local roads and 1,046 accidents on expressways, which are not negligible.

Since such road defects are irregularly shaped and randomly located, drivers are exposed to unexpected dangers that may lead to accidents.

Therefore, a specific technology is necessary to build a database storing road surface conditions and dangerous conditions, such as potholes, and provide danger information about road surfaces.

SUMMARY OF THE INVENTION

The present invention is directed to providing a method of building a database including road surface conditions, dangerous conditions, such as potholes, and the like and providing danger information about the road surface of each lane of a road.

According to an aspect of the present invention, there is provided a method of displaying road conditions on the basis of road cells, the method including receiving, by a server, a map including boundary and centerline information of a road and databasing the map, receiving, by the server, condition information of the road, generating, by the server, one or more cells by dividing the road on the map, and displaying, by the server, the condition information of the road in the cells.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The foregoing objects, features, and advantages of the present invention will become apparent from the following detailed description related to the accompanying drawings. However, the present invention is subject to various modifications and can have many different embodiments, and thus specific embodiments are illustrated in the drawings and described in detail below.

Throughout the specification, like reference numerals refer to like elements in principle. Also, components having the same function within the same scope of spirit shown in the drawings of embodiments are described using the same reference numerals, and the same description thereof will be omitted.

When it is determined that a detailed description of a well-known function or element related to the present invention may unnecessarily obscure the gist of the present invention, the detailed description will be omitted. Also, numbers (e.g., first, second, and the like) used in the description of the specification are merely identifiers for distinguishing one component from another.

In addition, the terms "module" and "part" of components used in embodiments below are given or used interchangeably solely for ease of specification and do not have a distinct meaning or role themselves.

In embodiments below, singulars include plurals unless the context clearly indicates otherwise.

In embodiments below, the terms "include," "have," and the like represent the presence of features or components described herein and do not preclude the possibility that one or more other features or components will be added.

In the drawings, components may be exaggerated or reduced in size for the convenience of description. For example, the size and thickness of each element shown in the drawing are arbitrary for the convenience of description and do not necessarily limit the present invention.

When a certain process is implementable in a different way, a specific process may be performed in a different order from that described herein. For example, two processes described in succession may be performed at substantially the same time or may be performed in a reverse order from that described herein.

In embodiments below, when components or the like are referred to as being connected, the components may be directly connected or indirectly connected with other components interposed therebetween.

For example, when components or the like are referred to as being electrically connected in the specification, the components or the like may be directly and electrically connected or indirectly connected with other components or the like interposed therebetween.

Figure 1:
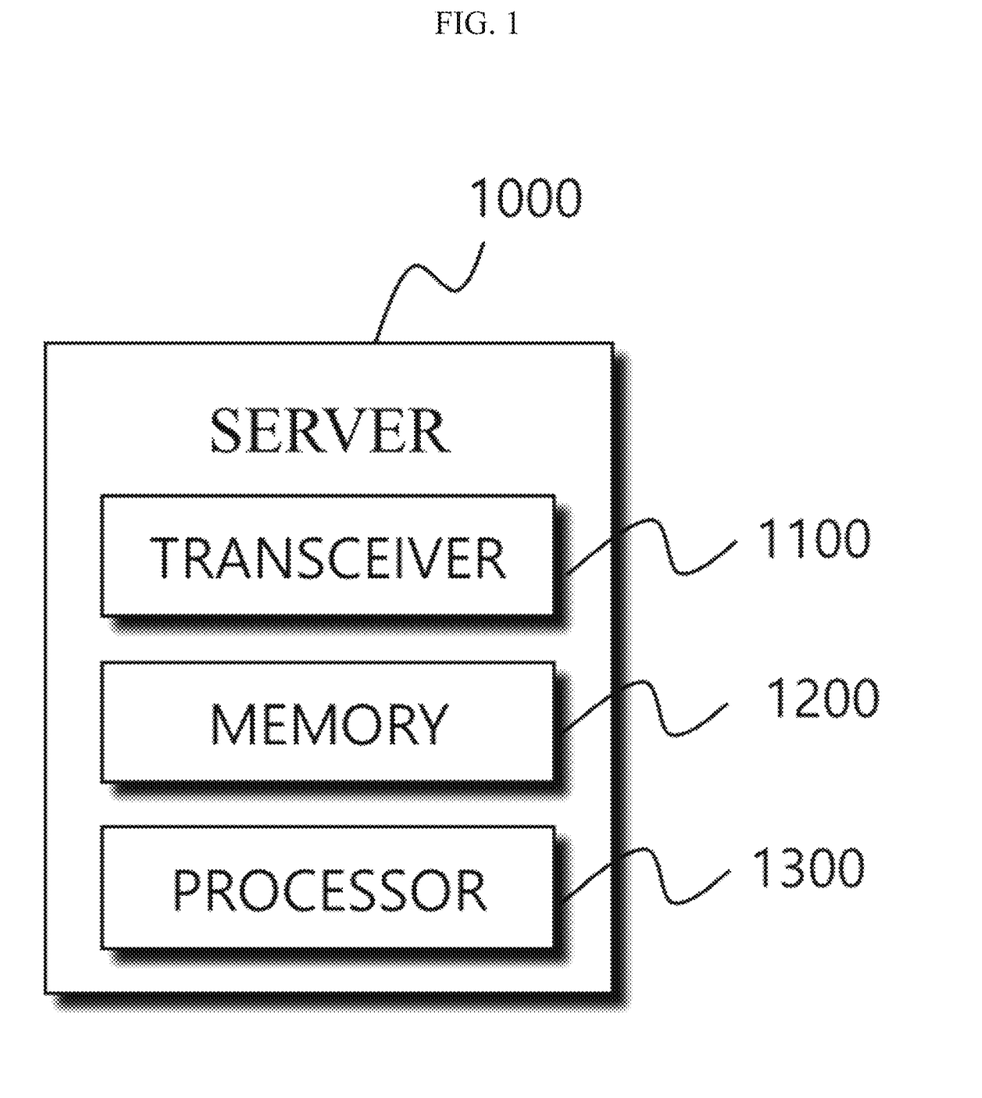
FIG. 1 is a schematic block diagram of a device (server) according to an exemplary embodiment of the present invention.

FIG. 1 is a schematic block diagram of a server according to an exemplary embodiment of the present invention.

Referring to FIG. 1, a server 1000 according to an exemplary embodiment of the present invention may include a transceiver 1100, a memory 1200, and a processor 1300.

The transceiver 1100 of the server 1000 may communicate with any external device. For example, the server 1000 may acquire a map including boundary and centerline information of a road through the transceiver 1100. As necessary, the map may include information of lane boundaries, facility locations, node links, and the like and may be a precise road map created by the National Geographic Information Institute.

Also, the server 1000 may externally acquire road condition information through the transceiver 1100. The road condition information may include road surface condition information, such as whether the road vibrates, whether the road tilts, the slope of the road, the degree of sinuosity, and the like, and road condition information of dangerous objects which are one or more selected from a dangerous object group including a pothole, a crack, a fallen object, and an accident location on the road.

The server 1000 may access a network through the transceiver 1100 and transmit and receive various types of data. The transceiver 1100 may be of a wired type or wireless type. Since the wired type and wireless type have their own merits and demerits, both wired and wireless types of transceivers may be provided in the server 1000 in some cases. Here, the wireless type of transceiver may mainly employ a wireless local area network (WLAN) communication method such as Wi-Fi. Alternatively, the wireless type of transceiver may employ a cellular communication method such as Long Term Evolution (LTE) or Fifth Generation (5G). However, wireless communication protocols are not limited to the above examples, and other appropriate wireless communication methods may be used. Representative examples of a wired communication protocol are LAN and Universal Serial Bus (USB) communication, and other methods are also available.

The memory 1200 of the server 1000 may store various types of information. In the memory 1200, various types of data may be stored temporarily or semi-permanently. Examples of the memory 1200 may be a hard disk drive (HDD), a solid state drive (SDD), a flash memory, a read-only memory (ROM), a random access memory (RAM), and the like. The memory 1200 may be provided in a form that is embedded in the server 1000 or detachable from the server 1000. In the memory 1200, an operating system (OS) for operating the server 1000, a program for operating each element of the server 1000, and also various types of data required for operations of the server 1000 may be stored.

The processor 1300 may control overall operations of the server 1000. For example, the processor 1300 may control an operation of receiving road map information including boundary and centerline information of a road and road condition information which will be described below and storing the road map information and the road condition information, an operation of generating one or more cells by dividing the road on the map, an operation of displaying the road condition information in the cells, and the like. Specifically, the processor 1300 may load a program for overall operations of the server 1000 from the memory 1200 and execute the program. The processor 1300 may be implemented as an application processor (AP), a central processing unit (CPU), a microcontroller unit (MCU), or a similar device thereto based on hardware, software, or a combination thereof. Here, the processor 1300 may be provided as hardware in the form of an electronic circuit that performs a control function by processing an electrical signal and provided as software in the form of a program or code that operates a hardware circuit.

According to an exemplary embodiment of the present invention, the processor 1300 may perform an operation of displaying condition information on a map, more specifically, an operation of generating one or more cells by dividing a set range of a road and displaying the road condition information in the cells. More specifically, the processor 1300 may perform an operation of generating cells by dividing a road at regular intervals and connecting lanes to lines extending perpendicular to the centerline, displaying first conditions of the road corresponding to the cells in a first layer, and displaying second conditions of the road corresponding to the cells in a second layer.

A system (or server) (hereinafter, "computing device") and method for displaying road conditions on the basis of road cells according to an exemplary embodiment of the present invention will be described below with reference to FIGS. 2 to 7. In the drawings, the same reference numeral refers to the same component.

Figure 2:
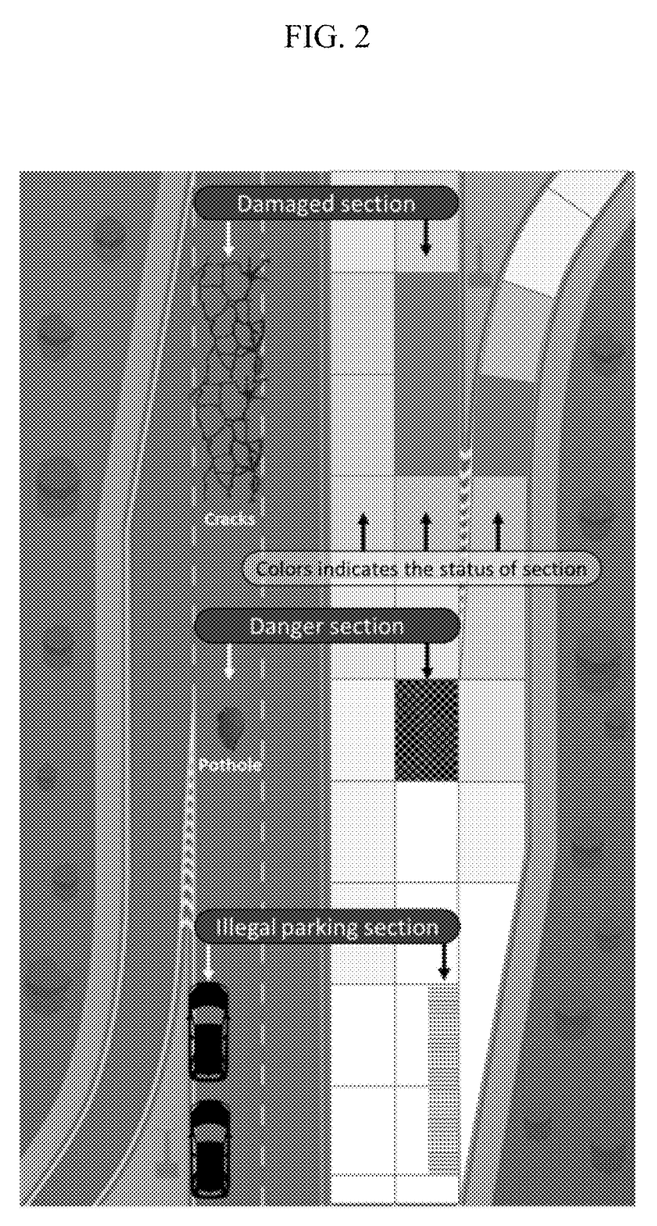
FIG. 2 shows a geometric data model of a map generated according to an exemplary embodiment of the present invention.

FIG. 2 shows a geometric data model of a road condition map generated according to an exemplary embodiment of the present invention. Referring to FIG. 2, according to the present invention, it is possible to create a road condition map in which lane-specific road condition information may be stored using a map including detailed information on lanes. A geometric data model for the road condition map includes a series of interconnected cells covering each lane area of the road as shown in the right half of FIG. 2, and the length of the cells may be adjusted for the application. Each cell may be represented in various ways on the basis of attributes that indicate the condition of the road. According to an exemplary embodiment, a cell may include a plurality of layers. A first layer may show road condition indices, that is, show the color of each cell according to a graded color palette of road condition indices. A second layer may show a section with a dangerous element, such as a pothole and the like, which may cause a traffic accident in a distinguishable form. Also, the second layer may also support the utilization of an emergency response agency by displaying a section with frequent illegal parking in a unique shape, such as the bottom of FIG. 2, on the basis of information identified about the section.

Figure 3:
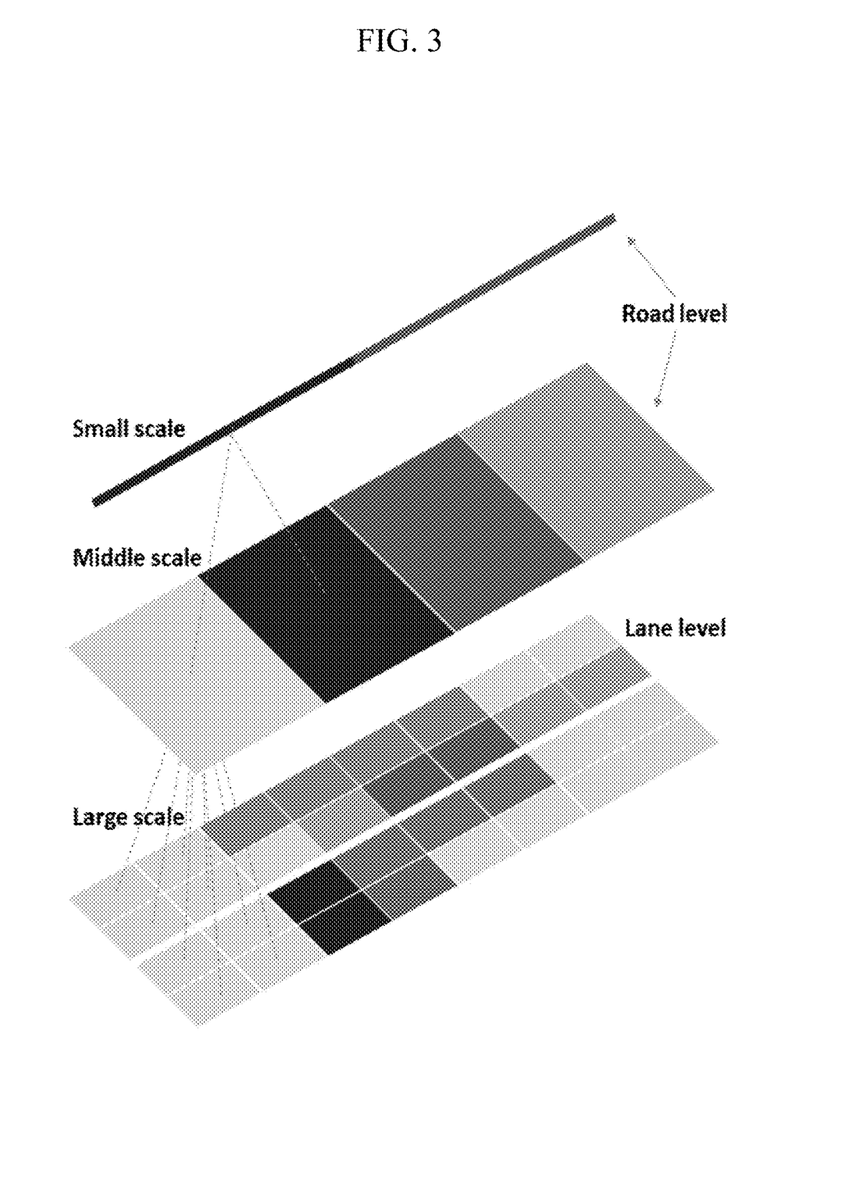
FIG. 3 is a diagram showing hierarchical structures for displaying scale-specific road surface maps according to an exemplary embodiment of the present invention.

FIG. 3 shows scale-specific hierarchical structures according to an exemplary embodiment of the present invention, which are intended to effectively represent a road condition map according to scale. Cells and line objects in a road condition map may include attribute information that indicates the condition of the road. As the attribute information of each object, only data from the most recent condition survey of the road surface may be stored, or the results of multiple surveys may be stored in the form of historical data. As necessary, cells and line objects may show road condition indices, and the colors of cells or lines may be displayed according to a graded color palette of road condition indices.

Figure 4:
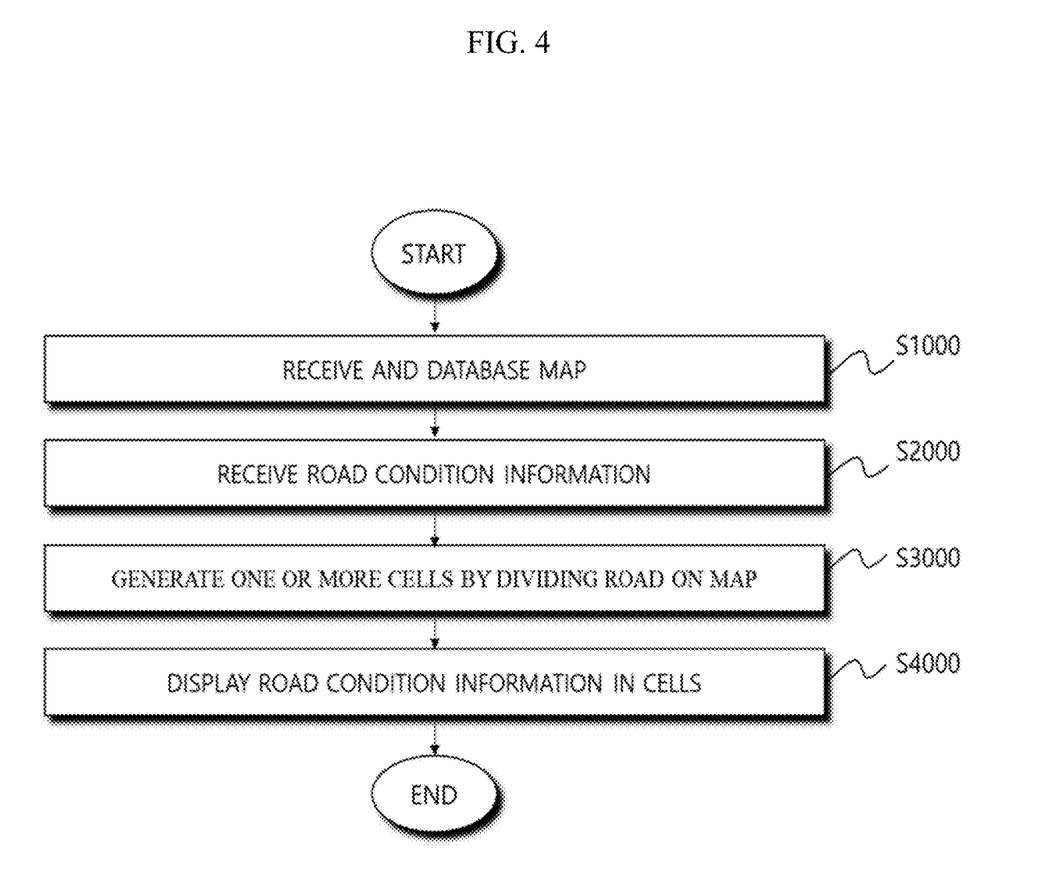
FIG. 4 is a flowchart illustrating a method of displaying road conditions on the basis of road cells according to an exemplary embodiment of the present invention.

FIG. 4 is a flowchart illustrating a method of displaying road conditions on the basis of road cells according to an exemplary embodiment of the present invention. Referring to FIG. 4, the method of displaying road conditions on the basis of road cells according to the exemplary embodiment of the present invention may include an operation S1000 of receiving a map including boundary and centerline information of a road and databasing the map, an operation S2000 of receiving condition information of the road, an operation S3000 of generating one or more cells by dividing the road on the map, and an operation S4000 of displaying the condition information of the road in the cells.

More specifically, a server may receive the map including the boundary and centerline information of the road and database the map (S1000). The map may include Global Positioning System (GPS) location information of the road and information on the boundaries and lanes, such as a centerline and the like, of the road and may also include information on the centerline of each lane as necessary. The server may acquire such a map from an external server, an external device, or the like.

The operation S2000 of receiving the condition information of the road is an operation of acquiring attribute information of the road for displaying road conditions on the map from the server or device.

Road condition indices are indices representing road conditions and may be classified into a plurality of grades according to a setting. According to a detailed exemplary embodiment, roads may be classified into four grades based on the level of danger by their road condition indices, and the four grades may be indicated by numbers or may be a safe stage, a sign stage, a cautious driving stage, and an impending repair stage. The road condition indices may be divided in comprehensive consideration of various factors that may indicate road conditions. In some cases, road condition indices may be calculated in comprehensive consideration of condition information which represents road surface conditions, such as whether the road vibrates, whether the road tilts, the slope of the road, the degree of sinuosity, and the like, and may be one or more pieces of information. Also, the server may give a color depending on the grade of a condition index and display the color corresponding to the grade of the cell in a layer of the map. In some cases, road condition indices may be calculated according to a formula defined by a user.

Attribute information of a road is data indicating a road surface condition or a road safety condition. Road conditions displayed on a road condition map may include a unique feature identifier (UFID) system, relevant road links in the UFID system, UFID-related features of an upscale road, a pavement status index (PSI) related to a road surface, the acquisition date of the PSI, past PSIs and the acquisition dates thereof, the risk level of traffic accidents, types of dangerous elements that may cause traffic accidents, whether there is an illegally parked vehicle on the road, a ride discomfort index (RDI), the acquisition date of the RDI, and past RDIs and the acquisition dates thereof. In addition, road conditions may include condition information indicating the conditions of a road surface, such as whether the road vibrates, whether the road tilts, the slope of the road, the degree of sinuosity, and the like, and a dangerous object group of a pothole, a crack, a fallen object, and an accident location on the road. Further, road conditions may include data that may indicate the surface or risk level of a road.

The server may perform the operation S3000 of generating the one or more cells by dividing a preset range of the road. This is for the purpose of dividing the road into cells and displaying various types of information about the road on the cells, and the user may adjust the size of the cells as necessary. In some cases, the server may generate cells by connecting lanes to lines extending perpendicular to the centerline. The cells are units for displaying road conditions of each lane or each location on the road on a road condition map. The server may intuitively display several items indicating road conditions by including a plurality of layers in the cells.

Figure 5:
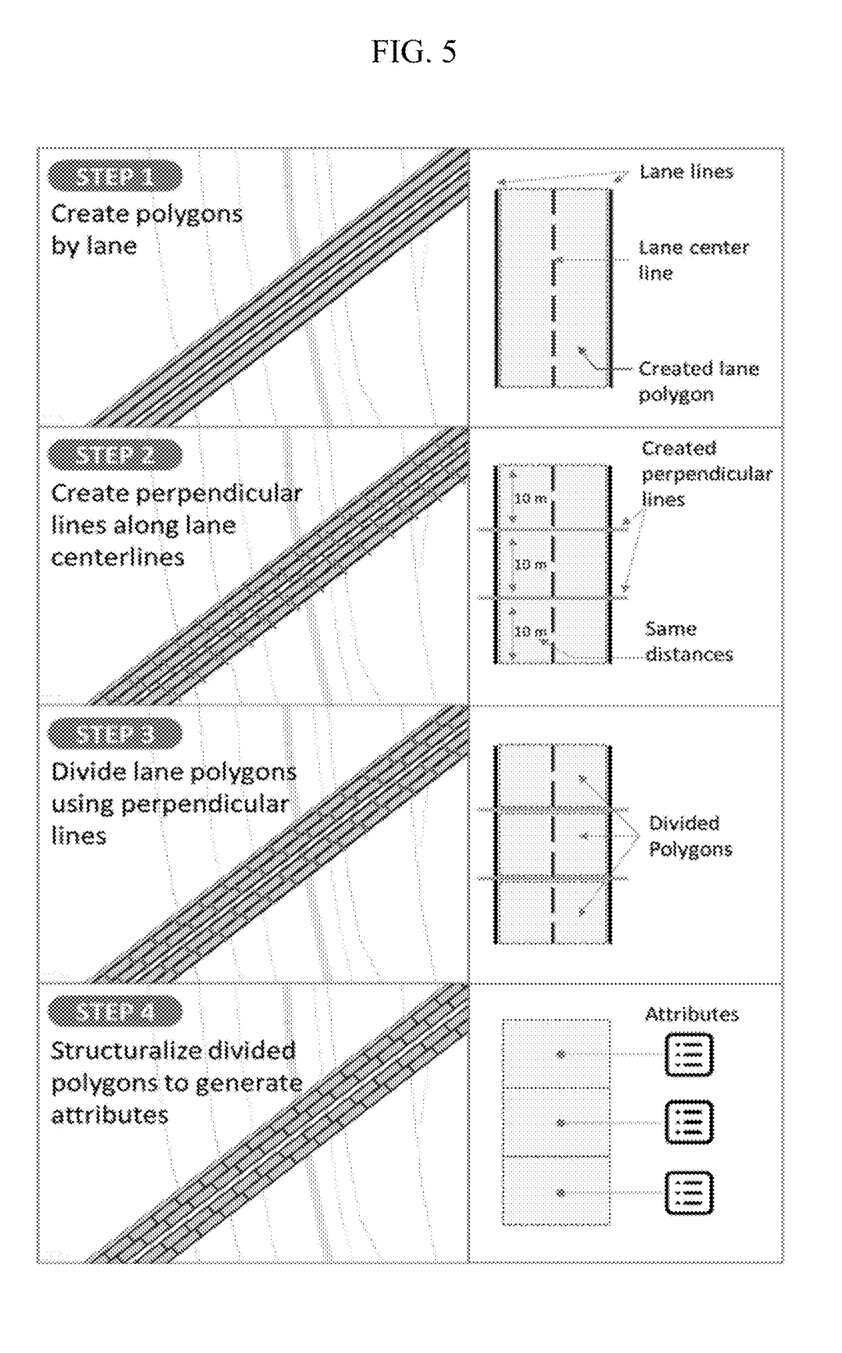
FIG. 5 illustrates a process of creating a road condition map using a map.

FIG. 5 illustrates a process of creating a road condition map using a map. According to the present invention, it is possible to build a road condition map that may store and show road conditions lane by lane using a map including a layer for road boundaries and lane-specific centerlines. More specifically, a first step of FIG. 5 shows a process of generating single polygons representing all lanes using road boundaries. In a second step, multiple normals that divide the lane centerlines at regular intervals are generated, and in a third step, the polygons generated in the first step are divided into cells using the generated normals. In a final fourth step, the cells which are generated with a certain size at regular intervals along the lanes are structuralized and linked with attribute data. Through the fourth step, a road condition map may be created. The attribute data may be displayed on the map through an additional layer.

The operation S4000 of displaying the condition information of the road in the cells is an operation of displaying road condition information corresponding to each cell in the cell.

More specifically, the operation S4000 of displaying the condition information of the road may include an operation of displaying a first condition of the road in a first layer.

The first layer is an element for displaying information in a cell and may have the same shape and size as the cell. More specifically, the operation of displaying the first condition of the road in the first layer may be an operation of grading road surface conditions using road condition indices, giving colors according to the grades, and displaying the colors in the first layer of the road. In this way, the user can check lane-specific road surface conditions more intuitively. In some cases, the first condition may be one or more pieces of condition information indicating the conditions of the road surface, such as whether the road vibrates, whether the road tilts, the slope of the road, the degree of sinuosity, and the like.

The operation S4000 of displaying the road condition information in the cells may include an operation of displaying a second condition of the road in a second layer. The second layer is an element for displaying information in a cell and may have the same shape and size as the cell. In addition, the operation of displaying the second condition of the road in the second layer is an operation of displaying dangerous elements of the road in the second layer. In some cases, the dangerous elements of the road may be road attribute information which is not included in a road condition index, specifically, information on potholes, cracks, fallen objects, illegally parked vehicles, and the like. The server may display dangerous elements of the road in the form of various patterns or shapes in the second layer, which may be shown on the map. In some cases, the second condition may be one or more selected from a group of a pothole, a crack, a fallen object, and an accident location on the road.

Figure 6:
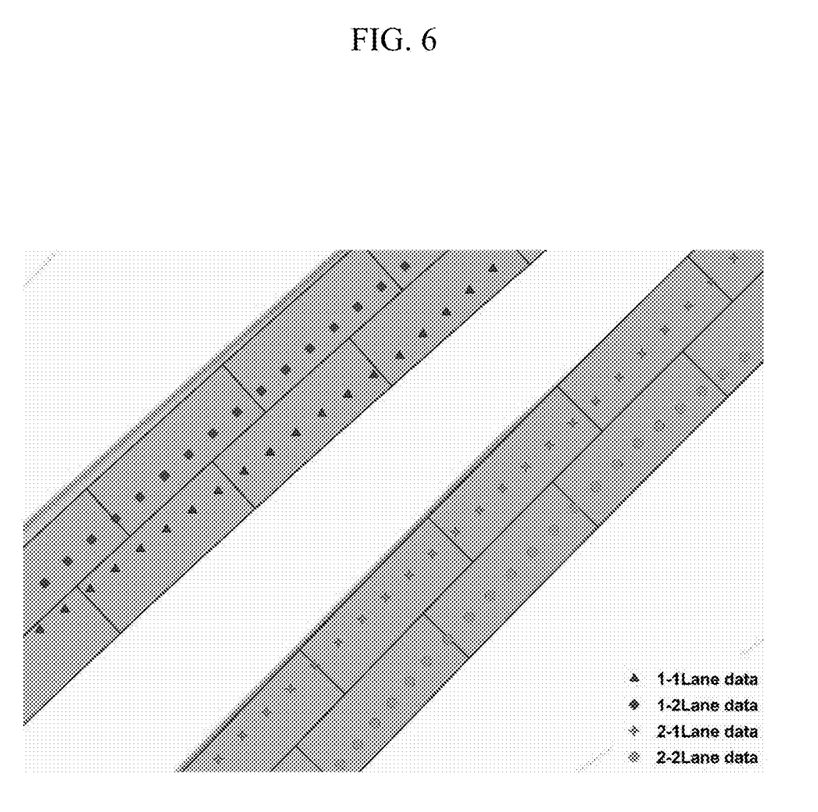
FIG. 6 is a diagram showing collected Global Navigation Satellite System (GNSS) position coordinates superimposed on a road condition map including continuous cells at 10-meter intervals.

FIG. 6 is a diagram showing a result of receiving road condition information including collected Global Navigation Satellite System (GNSS) position coordinate information, dividing a map into consecutive cells at 10-meter intervals, and then superimposing the road condition information on a map. To evaluate the feasibility and utilization of a road condition map, a pilot map was created and demonstrated regarding Gimcheon, Gyeongsangbuk-do. A road condition map was created for a partial road in Gimcheon, and field data was collected to generate schematic RDIs regarding the corresponding area.

Road condition information was collected by connecting a 3-axis accelerometer to a GNSS receiver, which supports network real time kinematic (RTK) positioning, and obtaining visually synchronized location information, 3-axis acceleration, and 2-axis tilt measurement values in a travelling vehicle. When coordinates obtained through network RTK positioning were overlaid on the road condition map created on the basis of a precise road map, it was possible to see that vehicle movement locations in each lane were accurately displayed on the road condition map of the corresponding lane. In FIG. 6, many data survey points are displayed in one cell. The maximum of multiple data survey values displayed in the same cell was selected and used as a representative value to calculate an RDI of the cell.

Figure 7:
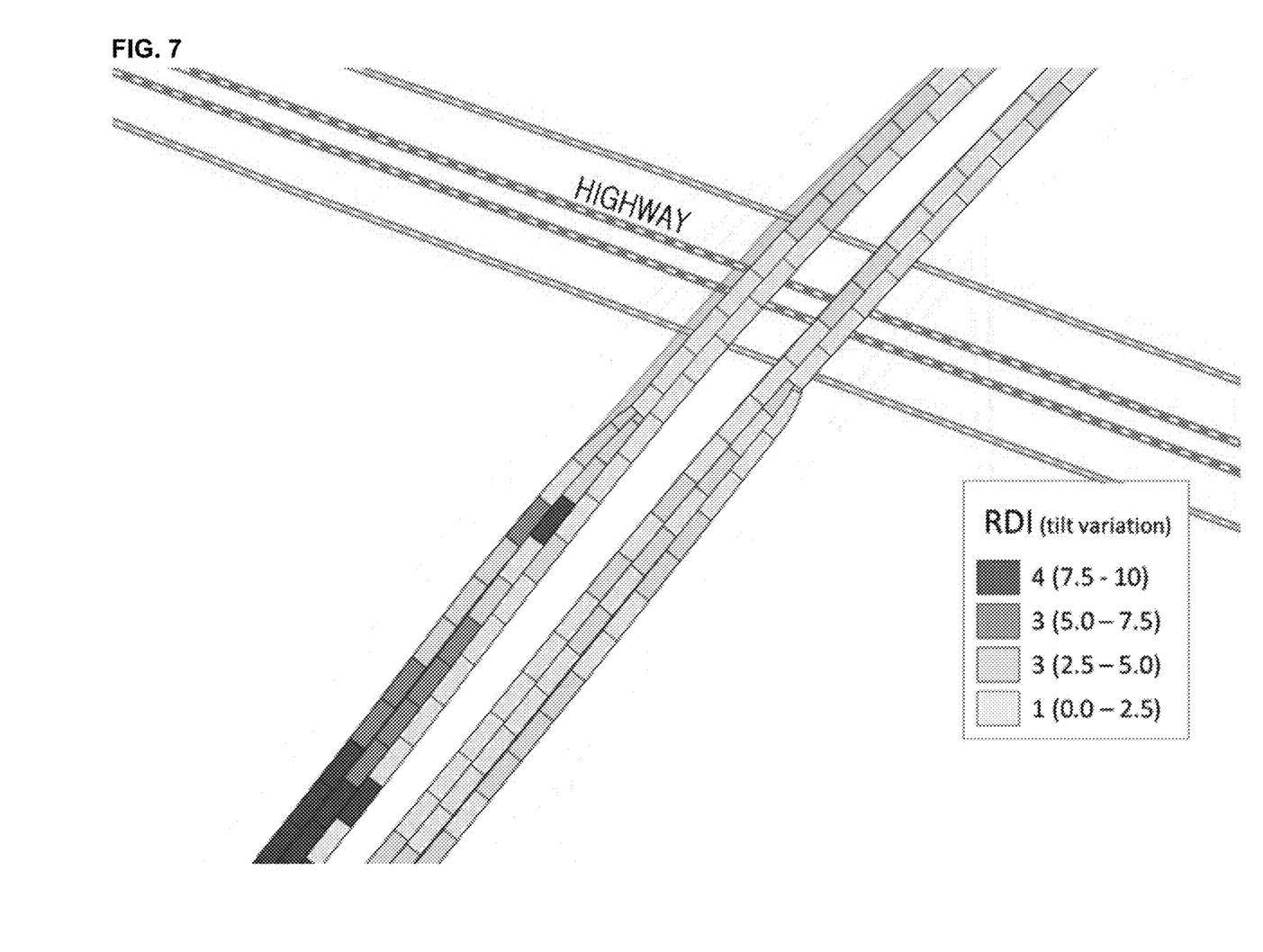
FIG. 7 is a pilot road condition map in which ride discomfort indices (RDIs) representing the ride comfort of a road are shown.

FIG. 7 is a pilot road condition map in which RDIs representing the ride comfort of a road are shown. In FIG. 7, schematic RDIs are calculated on the basis of a change in slope within a single cell which represents a portion of a lane, and the schematic RDIs are classified into four grades and displayed on the map. In the drawing, a road condition map may be seen that provides a comprehensive view of the RDIs of an entire road.

Another exemplary embodiment of the present invention may be a computer-readable recording medium on which a program for performing a method of displaying road conditions on the basis of road cells is recorded.

With a device and method for displaying road conditions on the basis of road cells according to exemplary embodiments of the present invention, lane information is acquired from a map to generate separate cells in different lanes, and cell-specific conditions are displayed so that a user can intuitively understand road conditions. Further, cells include one or more layers, and each layer displays attribute information of a road. Accordingly, various road information can be displayed in cells.

Meanwhile, various operations of the server 1000 described above may be stored in the memory 1200 of the server 1000, and the processor 1300 of the server 1000 may perform the operations stored in the memory 1200.

With a method of displaying road conditions on the basis of road cells according to an exemplary embodiment of the present invention, road condition information is generated lane by lane so that a user can understand road conditions more intuitively.

Effects of the present disclosure are not limited to that described above, and other effects which have not been described above will be clearly understood by those skilled in the art from the above description.

The features, structures, effects, and the like described above for the exemplary embodiments are included in at least one embodiment of the present invention and are not necessarily limited to one embodiment. Further, features, structures, effects, and the like exemplified by embodiments can be combined or modified in other embodiments by those skilled in the field to which the embodiments pertain. Therefore, such combinations and modifications should be construed as falling within the scope of the present invention.

Although the exemplary embodiments of the present invention have been described above, the embodiments are merely illustrative and do not limit the present invention. Those skilled in the field to which the present invention pertains will understand that various modifications and applications which have not been illustrated above are possible without departing from the essential characteristics of the present invention. In other words, each component specifically shown in an embodiment may be implemented in a modified form. Differences from these variations and applications should be construed as falling within the scope of the present invention defined by the appended claims.

What is claimed is:

1. A method of displaying road conditions on the basis of road cells, the method comprising:
   receiving, by a server, a map including boundary and centerline information of a road and databasing the map;
   receiving, by the server, condition information of the road;
   generating, by the server, cells by dividing the road on the map; and
   displaying, by the server, the condition information of the road in the cells,
   wherein each of the cells includes a first layer and a second layer,
   wherein the first layer has a same shape and size as a corresponding cell of the cells,
   wherein the second layer has a same shape and size as a corresponding cell of the cells,
   wherein the displaying of the condition information in the cells comprises:
      displaying a first condition of the road in the first layer, and
      displaying a second condition of the road in the second layer,
   wherein the first condition displayed in the first layer includes a plurality of pieces of condition information each of which indicates a condition of a surface among surfaces of the road, the surfaces of the road respectively corresponding to the cells,
   wherein the second condition displayed in the first layer includes dangerous elements of the road, and
   wherein the displaying of the condition information in the cells comprises:
      obtaining multiple data values on each cell of the cells, each of the multiple data values indicating a road condition of a corresponding cell of the cells.

2. The method of claim 1, wherein the displaying of the first condition of the road in the first layer comprises grading the conditions of the surfaces of the road and displaying grades of the conditions of the surfaces in the first layer of the road, and
   the displaying of the second condition of the road in the second layer comprises displaying the dangerous elements of the road in the second layer.

3. The method of claim 1, wherein the plurality of pieces of condition information include information on whether the road vibrates, information on whether the road tilts, a slope of the road, and a degree of sinuosity of the road.

4. The method of claim 3, wherein the dangerous elements include a pothole, a crack, a fallen object, and an accident location on the road.

5. The method of claim 1, wherein the generating of the cells comprises dividing each lane within a preset range of the road at regular intervals.

6. The method of claim 5, wherein the generating of the cells comprises generating the cells by connecting the lanes to lines extending perpendicular to the centerline.

7. A computer-readable recording medium on which a program for performing the method of claim 1 is recorded.

8. A device for displaying road conditions on the basis of road cells, the device comprising a server configured to display road conditions on the basis of road cells,
wherein the server comprises:
a transceiver configured to externally receive a map and condition information of a road;
a memory configured to store the received information; and
a processor configured to display the condition information on the map,
wherein the processor generates cells by dividing a preset range of the road and displays the condition information of the road in the cells,
wherein each of the cells includes a first layer and a second layer,
wherein the first layer has a same shape and size as a corresponding cell of the cells,
wherein the second layer has a same shape and size as a corresponding cell of the cells,
wherein the displaying of the condition information in the cells comprises:
displaying a first condition of the road in the first layer, and
displaying a second condition of the road in the second layer,
wherein the first condition displayed in the first layer includes a plurality of pieces of condition information each of which indicates a condition of a surface among surfaces of the road, the surfaces of the road respectively corresponding to the cells,
wherein the second condition displayed in the first layer includes dangerous elements of the road, and
wherein the displaying of the condition information in the cells comprises:
obtaining multiple data values on each cell of the cells, each of the multiple data values indicating a road condition of a corresponding cell of the cells.

9. The device of claim 8, wherein the processor generates the cells by dividing the road at regular intervals and connecting lanes to lines extending perpendicular to a centerline, displays first conditions of the road corresponding to the cells in the first layer, and displays second conditions of the road corresponding to the cells in the second layer.

* * * * *